United States Patent
Jeong et al.

(10) Patent No.: US 6,741,321 B2
(45) Date of Patent: May 25, 2004

(54) COLOR LIQUID CRYSTAL DISPLAY MANUFACTURING PROCESS AND RAW PANEL FOR USE THEREIN

(75) Inventors: Seok-Hong Jeong, Cheonan (KR); Woon-Seop Choi, Seoul (KR); Jeong-Geun Yoo, Seoul (KR); Yeon-Gon Mo, Seoul (KR); Min-Kyu Kim, Seoul (KR); Hee-Jung Lee, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/315,733

(22) Filed: Dec. 9, 2002

(65) Prior Publication Data

US 2003/0133069 A1 Jul. 17, 2003

(30) Foreign Application Priority Data

Jan. 15, 2002 (KR) .......................................... 2002-2325

(51) Int. Cl.⁷ .................... G02F 1/1343; G02F 1/1339; G02F 1/13
(52) U.S. Cl. ........................ 349/187; 349/156; 349/148
(58) Field of Search ................................ 349/148, 156, 349/187

(56) References Cited

U.S. PATENT DOCUMENTS

| | | | | |
|---|---|---|---|---|
| 3,861,783 A | * | 1/1975 | Dill et al. | 349/156 |
| 5,399,390 A | | 3/1995 | Akins | |
| 5,771,084 A | * | 6/1998 | Fujimori et al. | 149/153 |
| 5,825,451 A | | 10/1998 | Ma et al. | |
| 5,828,434 A | * | 10/1998 | Koden et al. | 349/148 |
| 6,118,510 A | * | 9/2000 | Bradshaw et al. | 349/156 |

* cited by examiner

Primary Examiner—Julie Ngo
(74) Attorney, Agent, or Firm—Christie, Parker & Hale, LLP

(57) ABSTRACT

A raw panel for a liquid crystal display. A first substrate includes first electrodes opposing a second substrate including second electrodes. A plurality of main walls having a predetermined height are arranged in a striped pattern between first and second substrates to define a plurality of channels. The channels include sets of pixels, each set formed by three neighboring channels. First sub-walls are mounted at a predetermined distance from a first end line and between the main walls defining first channels in sets the first channels each having at least two separate spaces. Second sub-walls are mounted at a predetermined second distance from the first end line and between the main walls defining second channels in sets, the second channels each having at least two separate spaces. The raw panel is opened at the first end line and at a second end line opposite the first end line.

10 Claims, 4 Drawing Sheets

COLOR LIQUID CRYSTAL DISPLAY MANUFACTURING PROCESS AND RAW PANEL FOR USE THEREIN

CROSS-REFERENCE TO RELATED APPLICATIONS

This application claims priority to and the benefit of Korean Application No. 2002-2325, filed on Jan. 15, 2002 in the Korean Intellectual Property Office, the entire disclosure of which is incorporated herein by reference.

FIELD OF THE INVENTION

The present invention relates to a color liquid crystal display. More particularly, the present invention relates to a raw panel used in a color liquid crystal display that comprises all R,G,B cholesteric liquid crystal materials, and to a method for manufacturing a liquid crystal display using the raw panel.

BACKGROUND OF THE INVENTION

A cholesteric liquid crystal display is a display device comprising chiral nematic liquid crystal materials which are bistable in absence of a field. The two bistable textures are the weakly-scattering focal conic texture and the reflective planar texture in which selective light having a wavelength corresponding to the helical pitch of liquid materials are reflected. The pitch length can be controlled by adjusting the amount of chiral dopants.

For example, a cholesteric liquid crystal display (hereinafter referred to as a cholesteric LCD) adopting liquid crystal material having a helical pitch length of 550 nm results in a single-color display that reflects green light for the display of images.

Hence, for full color images, a cholesteric LCD containing at least three different types of cholesteric liquid crystal materials corresponding to the wavelengths of at least red, green, and blue light are needed.

A full colored cholesteric LCD can be achieved by stacking each colored material layer in separate panels. The stacked color display requires at least four substrates to accommodate R,G,B colored materials, as well as addressing means to control three different panels simultaneously, which increases the cost of display devices.

Another way to produce a full color display is by injecting each colored liquid crystal material into separate regions within a single panel. This is referred to as a 1-panel cholesteric LCD. However, there is the practical difficulty of defining each individual microscopic pixel with different amounts of chiral dopants.

U.S. Pat. No. 5,825,451 discloses manufacturing methods of a 1-panel cholesteric LCD in which twist agents (chiral dopants) are deposited at predetermined points corresponding to each colored pixel on a first substrate, which is then assembled with a second substrate to define separate interstitial regions for each pixel, and liquid crystal materials having an initial pitch are introduced into the interstitial regions.

Twist agents can be deposited by a printing method, however, it is difficult to control the precise amount of twist agent required to reflect proper wavelengths. Thus, a color display device with good picture quality cannot be obtained.

SUMMARY OF INVENTION

According to the present invention a raw panel used for a liquid crystal display and a method for manufacturing 1-panel color liquid crystal display devices is provided in which different types of cholesteric liquid crystal materials are easily injected separately into a single liquid crystal panel without having to undergo an elaborate printing process of twist agents, thereby realizing a high resolution color display.

According to an embodiment of the present invention, a raw panel for a liquid crystal display is provided having a first substrate which includes first electrodes. A second substrate is provided opposing the first substrate. The second substrate includes second electrodes on a surface that opposes the first substrate. A plurality of main walls having a predetermined height is arranged in a striped pattern between the first and second substrates to thereby define a plurality of channels. The channels include sets of pixels, each set of pixels being formed by three neighboring channels. First sub-walls are mounted between the main walls defining first channels in sets, to thereby divide the first channels into at least two separate spaces. The first sub-walls are mounted at a predetermined first distance from a first end line, which is formed along one of two ends of the main walls. Second sub-walls are mounted between the main walls defining second channels in sets, to thereby divide the second channels into at least two separate spaces. The second sub-walls are mounted at a predetermined second distance from the first end line. The raw panel is opened between the main walls at the first end line as well as at a second end line which is formed along an end of the main walls opposite that along which the first end line is formed.

According to an embodiment of the present invention, the predetermined distance at which the first sub-walls are mounted from the first end line is different from the predetermined distance at which the second sub-walls are mounted from the first end line.

According to an embodiment of the present invention, a method for manufacturing a liquid crystal display is provided that includes preparing a raw panel. A first substrate includes first electrodes. A second substrate is provided opposing the first substrate. The second substrate includes second electrodes on a surface that opposes the first substrate. A plurality of main walls having a predetermined height are arranged in a striped pattern between the first and second substrates to thereby define a plurality of channels. The channels include sets of pixels, each set of pixels being formed by three neighboring channels. First sub-walls are mounted between the main walls defining first channels in sets to thereby divide the first channels into at least two separate spaces. The first sub-walls are mounted at a predetermined first distance from a first end line which is formed along one of two ends of the main walls. The second sub-walls are mounted between the main walls defining second channels in sets, to thereby divide the second channels into at least two separate spaces. The second sub-walls are mounted at a predetermined second distance from first end line. The raw panel is opened between the main walls at the first end line as well as at a second end line. The second end line is formed along an end of the main walls opposite that along which the first end line is formed providing sealing spaces between the main walls along the second end line. In the method, liquid crystals are injected into third channels, which are channels that do not have first and second sub-walls formed therein. The third channels are then sealed by closing off the spaces between the main walls defining the third channels. The raw panel is cut along a first cutting line, which is at a location such that the first sub-walls are removed after the cutting is performed. Liquid crystals are injected into the first channels. The first channels are sealed by closing off the spaces between the main walls defining first channels. The raw panel is cut along a second cutting line, which is at a location such that second sub-walls are removed after the cutting is performed. Liquid crystals are injected into the second channels and the second channels are sealed by closing off the spaces between the main walls defining the second channels.

According to an embodiment of the present invention, the liquid crystals are cholesteric liquid crystals.

According to an embodiment of the present invention, the sealing of the first, second, and third channels is performed using an ultraviolet ray hardener, namely a sealant hardened by ultraviolet rays.

According to an embodiment of the present invention, the first and second sub-walls are mounted substantially perpendicular to the main walls.

According to an embodiment of the present invention, the first and second cutting lines are substantially parallel to the first end line.

According to yet another embodiment of the present invention, a raw panel for a liquid crystal display is provided, including: a first substrate including first electrodes; a second substrate opposing the first substrate, the second substrate including second electrodes on a surface that opposes the first substrate; and a plurality of main walls having a predetermined height between the first and second substrates to thereby define a plurality of separate channels. The channels include sets of pixels, each set of pixels being formed by at least two neighboring channels, wherein at least one channel of the sets is divided into two separate spaces along a longitudinal direction of the main walls by a sub-wall mounted between the main walls.

According to another embodiment of the present invention, each set of pixels is formed by three neighboring channels.

According to another embodiment of the present invention, each set of pixels includes sub-walls mounted between the main walls defining each different channel, the distances of the sub-walls to a first end line, which is formed along one of two ends of main walls, being formed differently.

DETAILED DESCRIPTION OF INVENTION

Figure 1:
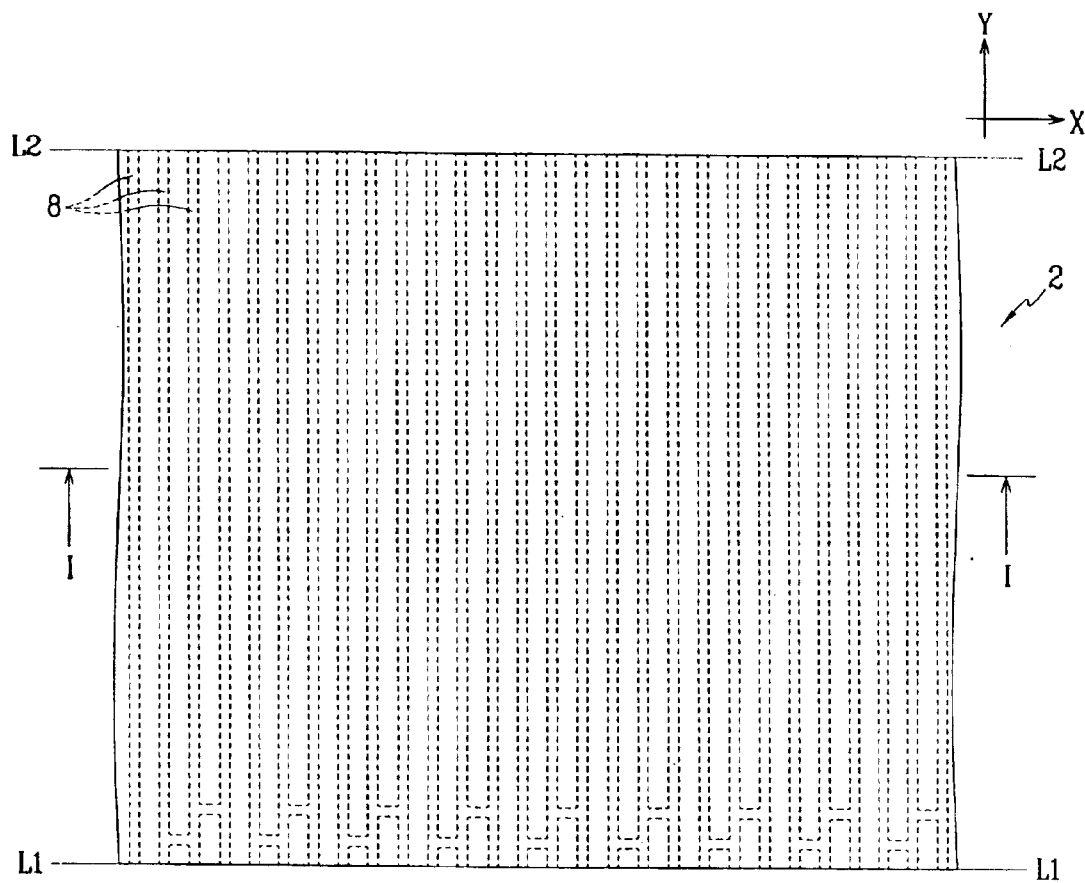
FIG. 1 is a schematic plan view of a raw panel for a liquid crystal display according to an embodiment of the present invention.
Figure 2:
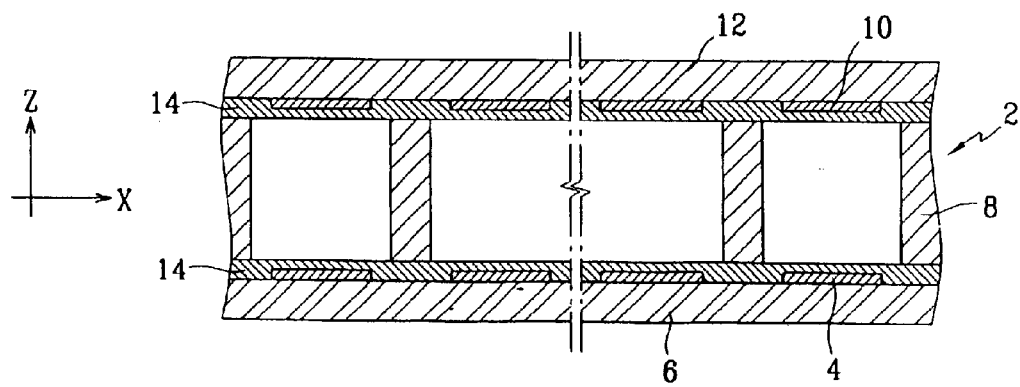
FIG. 2 is a sectional view taken along line I—I of FIG. 1.
Figure 3:
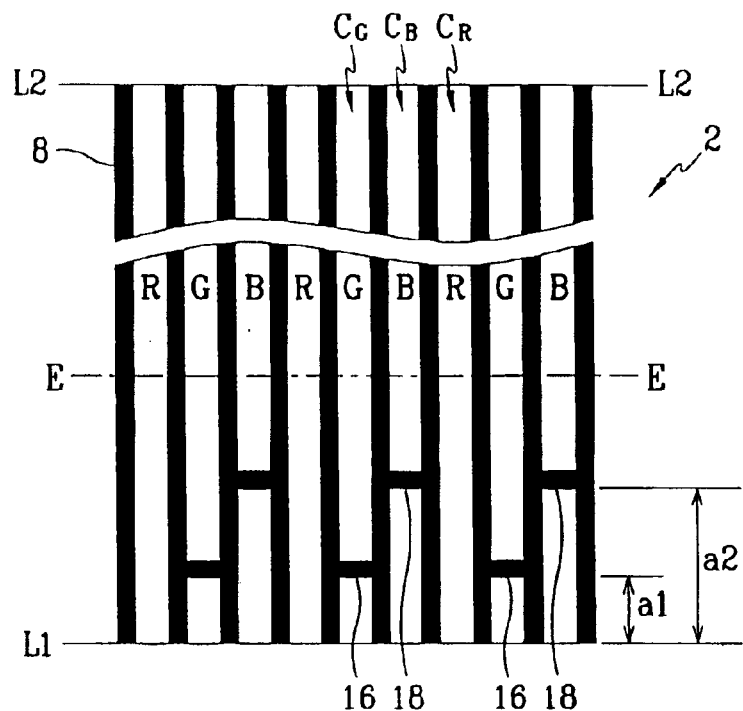
FIG. 3 is a partially enlarged view of the raw panel of FIG. 1.
Figure 4:
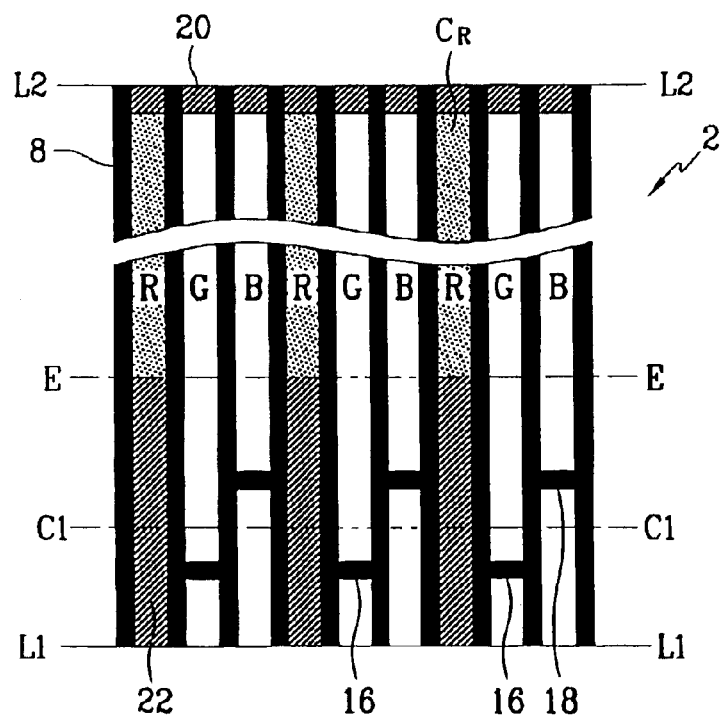
FIGS. 4–8 are schematic views used to describe a method for manufacturing a liquid crystal display according to an embodiment of the present invention.
Figure 5:
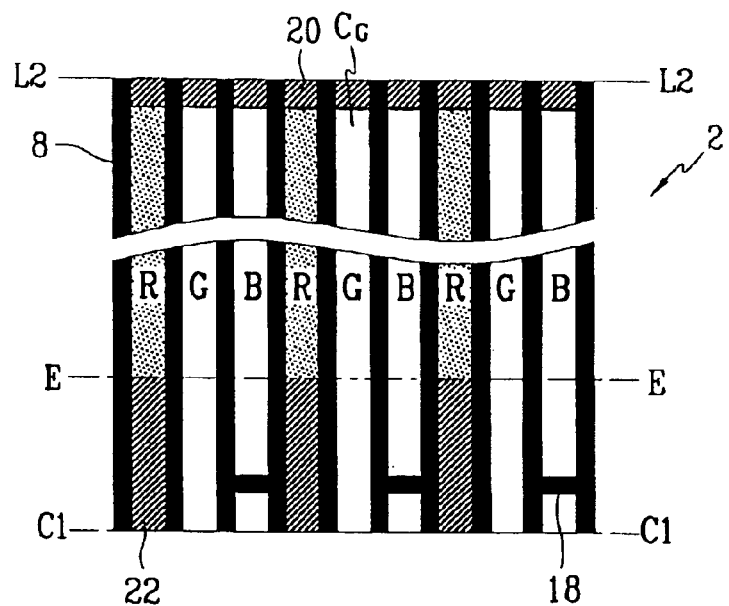

Referring to FIGS. 1, 2 and 3, raw panel 2 includes first substrate 6 having formed thereon first electrodes 4 for driving liquid crystals. A plurality of main walls 8 are arranged in a striped pattern on first substrate 6. Main walls 8 define a plurality of channels. Second substrate 12 is provided substantially parallel to first substrate 6 with main walls 8 interposed therebetween to realize a single assembly with first and second substrates 6 and 12. Second substrate 12 has formed thereon second electrodes 10 for driving the liquid crystals.

In raw panel 2, as an example, main walls 8 are formed in their striped pattern along a short axis direction of first and second substrates 6 and 12 (i.e., along axis Y in FIG. 1) to define spaces into corresponding channels into which R,G,B cholesteric liquid crystals are injected. Also, the channels have sets of pixels, each set of pixels being formed by at least two neighboring channels therein. In an embodiment, each set of pixels is formed by three (R,G,B) neighboring channels.

Pre-tilt alignment layer 14 is formed on a surface of first substrate 6 opposing second substrate 12 and on which first electrodes 4 are formed, and on a surface of second substrate 12 opposing first substrate 6 and on which second electrodes 10 are formed.

First and second substrates 6 and 12 include two long sides that are perpendicular to the direction at which main walls 8 are arranged, that is, two long sides are formed along the X axis in FIGS. 1 and 2. One of the long sides provided at one end of main walls 8 will be referred to as first end line L1, and other of the two long sides at opposite end of main walls 8 will be referred to as second end line L2.

Raw panel 2 has an open structure with respect to all of the R,G,B channels on a side of second end line L2. That is, before liquid crystals are injected into the channels, a sealant or other such blocking agent is not applied between main walls 8 on the side of second end line L2. This acts to prevent damage to raw panel 2 when pressure is applied to first and second substrates 6 and 12 to realize the single assembly of these elements.

On other hand, on the side of first end line L1 of raw panel 2, first and second sub-walls 16 and 18 are mounted between main walls 8 in two of the three R,G,B channels defined by the main walls. For example, first sub-walls 16 are provided between main walls 8 in all of the G channels, while second sub-walls 18 are provided between main walls 8 in all of the B channels (this will be described in more detail below). First and second sub-walls 16 and 18 enable liquid crystals to be easily injected separately into the correct R,G,B channels. Further, first sub-walls 16 are separated from first end line L1 at a distance different from that at which second sub-walls 18 are distanced from first end line L1.

As an example, if the G channels are referred to as first channels $C_G$, first sub-walls 16 are positioned in first channels $C_G$ connected and substantially perpendicular to main walls 8 defining first channels $C_G$, and at distance a1 from first end line L1. Therefore, first channels $C_G$ are divided into at least two separate spaces.

Similarly, if the B channels are referred to as second channels $C_B$, second sub-walls 18 are positioned in second channels $C_B$ connected and substantially perpendicular to main walls 8 defining second channels $C_B$ and at distance a2 from first end line L1. Therefore, second channels $C_B$ are divided into at least two separate spaces. $C_R$ in FIG. 3 refers to remaining third channels, that is, R channels.

First and second sub-walls 16 and 18 are mounted between first end line L1 and end seal line E, at which a sealant is formed to seal R,G,B channels after the liquid crystals are injected into each of the R,G,B channels.

In an embodiment of the present invention structured as set forth above, first and second sub-walls 16 and 18 are formed to close first and second channels $C_G$ and $C_B$ at predetermined distances from first end line L1 such that when liquid crystals are separately injected into the R,G,B channels, the liquid crystals are supplied to their intended channel (i.e., are prevented from entering the wrong channel).

FIGS. 4–8 are schematic views used to describe a method for manufacturing a liquid crystal display according to an embodiment of the present invention.

First, raw panel 2 structured as described above is prepared for manufacture of a cholesteric LCD. Next, with reference to FIG. 4, first sealant 20, such as an ultraviolet ray hardener, is provided between main walls 8 in all R,G,B channels. First sealant 20 is supplied from second end line L2 and extends a predetermined distance within the raw panel therefrom. Ultraviolet rays are then irradiated onto first sealant 20 to harden same such that one end of first, second, and third channels $C_G$, $C_B$, and $C_R$ is sealed.

Next, raw panel 2 is controlled to a vacuum state, and in this state, cholesteric liquid crystals corresponding to third channels $C_R$ are provided into third channels $C_R$. For example, raw panel 2 is immersed in a tank (not shown) that is filled with R cholesteric liquid crystals such that first end line L1 is submerged in liquid crystals. Next, a vacuum is developed such that R cholesteric liquid crystals are selectively injected into third channels $C_R$.

Subsequently, second sealant 22 is provided into third channels $C_R$ UP to end seal line E. Then second sealant 22 is hardened using ultraviolet rays to thereby seal third channels $C_R$. This completes injection of cholesteric liquid crystals into R channels. During this process, injection of R cholesteric liquid crystals into G channels and B channels is prevented by first and second sub-walls 16 and 18, which block the entrance of R cholesteric liquid crystals.

After the above, G cholesteric liquid crystals are injected into first channels $C_G$, which correspond to G channels. In more detail, raw panel 2 is cut along first cutting line C1, which is formed substantially perpendicular to main walls 8 between first and second sub-walls 16 and 18. As a result, with reference to FIG. 5, first sub-walls 16 are removed from raw panel 2 and access to G channels is gained.

Figure 6:
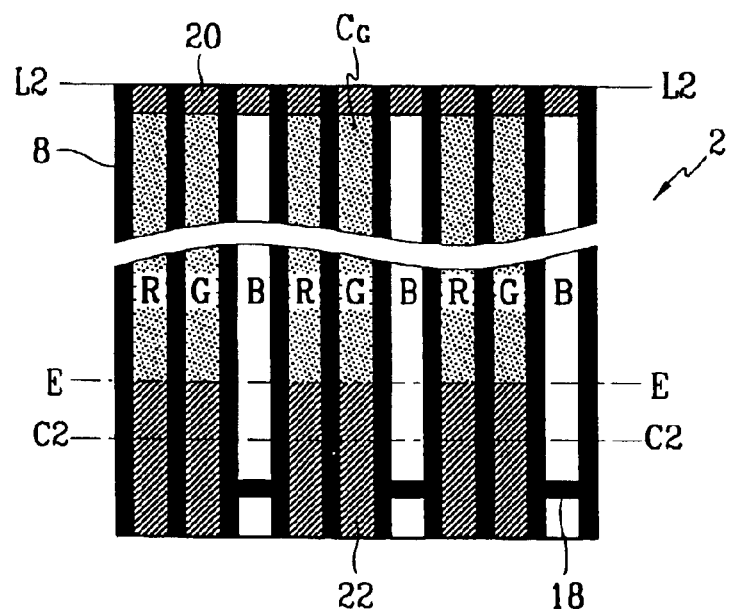
Figure 7:
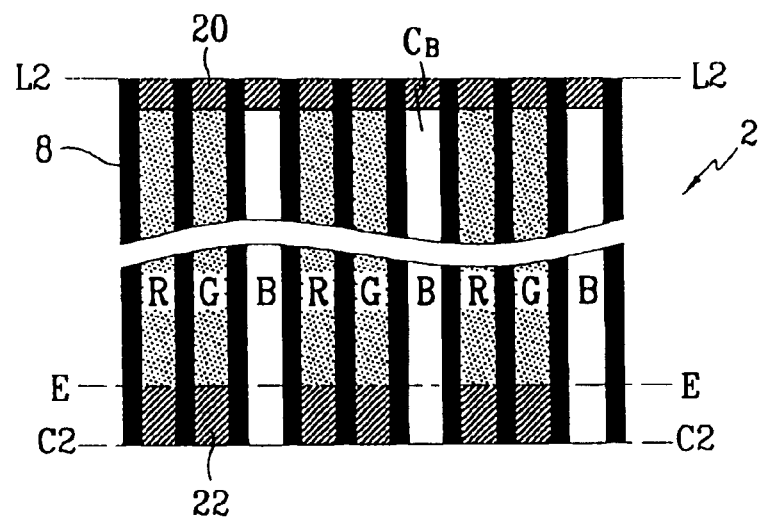

Next, with reference to FIG. 6, using the liquid crystal injection method described above, raw panel 2 is controlled to a vacuum state. Then raw panel 2 is immersed in a tank (not shown) that is filled with cholesteric liquid crystals corresponding to first channels $C_G$, that is, G cholesteric liquid crystals, such that first cutting line C1 is submerged in liquid crystals. Next, a vacuum is developed such that G cholesteric liquid crystals are selectively injected into first channels $C_G$. During the liquid crystal injection process, second sealant 22 prevents G cholesteric liquid crystals from entering third channels $C_R$, and second sub-walls 18 prevent G cholesteric liquid crystals from entering second channels $C_B$.

After selective injection of G cholesteric liquid crystals into first channels $C_G$, second sealant 22 is filled into the G channels up to end seal line E. Second sealant 22 is then hardened using ultraviolet rays to thereby seal first channels $C_G$. This completes injection of cholesteric liquid crystals into the G channels.

Next, for injection of liquid crystals corresponding to second channels $C_B$, that is, B cholesteric liquid crystals, raw panel 2 is cut along second cutting line C2, which is formed substantially perpendicular to main walls 8 between end seal line E and second sub-walls 18. As a result, with reference to FIG. 7, second sub-walls 18 in the B channels are removed from raw panel 2 and access to B channels is gained.

Figure 8:
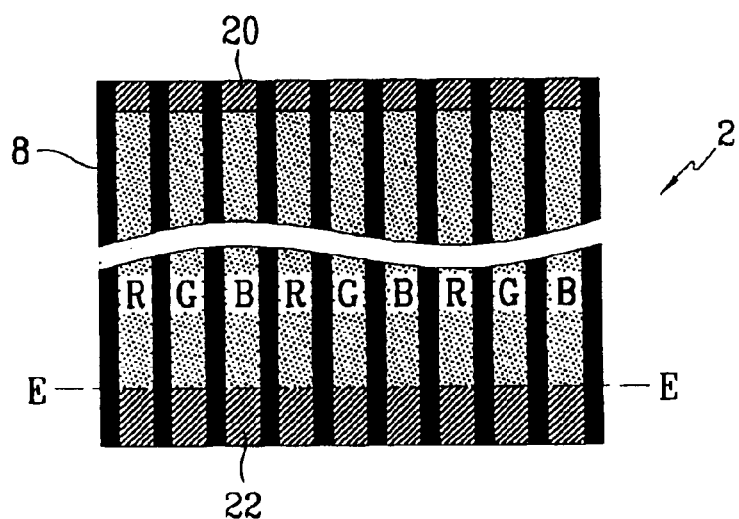

Next, with reference to FIG. 8, using the liquid crystal injection as described above, raw panel 2 is controlled to a vacuum state. Then raw panel 2 is immersed in a tank (not shown) that is filled with cholesteric liquid crystals corresponding to second channels $C_B$, that is, B cholesteric liquid crystals, such that second cutting line C2 is submerged in liquid crystals. Next, a vacuum is developed such that B cholesteric liquid crystals are selectively injected into second channels $C_B$. Next, second sealant 22 is filled into the B channels up to end seal line E. The second sealant 22 is hardened using ultraviolet rays to thereby seal second channels $C_B$. This completes injection of cholesteric liquid crystals into B channels.

According to the embodiments of the present invention described above, the entrance of liquid crystal material into channels for which it is not intended is prevented while easily enabling different types of liquid crystal material to be separately injected into the LCD. Therefore, a 1-panel color LCD may be easily manufactured without having to undergo a precise printing process of twist agents, and advantages are realized in the manufacture of a high resolution display.

Although various embodiments of the present invention have been described in detail hereinabove, it should be clearly understood that many variations and/or modifications of basic inventive concepts herein taught which may appear to those skilled in the present art will still fall within spirit and scope of the present invention, as defined in the appended claims.

What is claimed is:

1. A raw panel for a liquid crystal display, comprising:
   a first substrate including first electrodes;
   a second substrate opposing the first substrate, the second substrate including second electrodes on a surface that opposes the first substrate;
   a plurality of main walls having a predetermined height; and arranged in a striped pattern between the first substrate and the second substrate to thereby define a plurality of channels, wherein the channels include sets of pixels, each set of pixels being formed by three neighboring channels;
   first sub-walls mounted between the main walls defining first channels in sets, to thereby divide each of the first channels into two separate spaces, the first sub-walls being mounted at a predetermined first distance from a first end line, which is formed along one of two ends of the main walls; and
   second sub-walls mounted between the main walls defining second channels in sets, to thereby divide each of the second channels into two separate spaces, the second sub-walls being mounted at a predetermined second distance from first end line,
   wherein, the raw panel is opened between the main walls at the first end line as well as at a second end line, which is formed along an end of main walls opposite that along which the first end line is formed.

2. The raw panel for a liquid crystal display of claim 1, wherein the predetermined distance at which the first sub-walls are mounted from the first end line is different from the predetermined distance at which the second sub-walls are mounted from the first end line.

3. A method for manufacturing a liquid crystal display, comprising:
   preparing a raw panel by:
   a) providing a first substrate having first electrodes;
   b) providing a second substrate opposing the first substrate, the second substrate having second electrodes on a surface that opposes first substrate;
   c) arranging in a striped pattern between the first substrate and the second substrate to thereby define a plurality of channels, a plurality of main walls having a predetermined height, wherein the channels include sets of pixels, each set of pixels being formed by three neighboring channels;

d) mounting first sub-walls between the main walls defining first channels in sets, to thereby divide each of the first channels into two separate spaces, the first sub-walls being mounted at a predetermined first distance from a first end line, which is formed along one of two ends of main walls; and e) mounting second sub-walls between main walls defining second channels in sets, to thereby divide each of the second channels into two separate spaces, the second sub-walls being mounted at a predetermined second distance from the first end line, wherein the raw panel is opened between the main walls at the first end line as well as at a second end line, which is formed along an end of main walls opposite that along which first end line is formed;

sealing spaces between the main walls along the second end line;

injecting liquid crystals into third channels absent first sub-walls and second sub-walls being formed therein;

sealing the third channels by closing off spaces between the main walls defining the third channels;

cutting the raw panel along a first cutting line, which is at a location such that the first sub-walls are removed after cutting is performed;

injecting liquid crystals into the first channels and sealing the first channels by closing off spaces between the main walls defining the first channels;

cutting the raw panel along a second cutting line, which is at a location such that the second sub-walls are removed after cutting is performed;

injecting liquid crystals into the second channels; and sealing the second channels by closing off spaces between the main walls defining the second channels.

4. The method of claim 3, wherein the liquid crystals are cholesteric liquid crystals.

5. The method of claim 3, further comprising sealing the first channels, the second channels, and the third channels using an ultraviolet ray hardener as a sealant and hardening the sealant by ultraviolet rays.

6. The method of claim 3, further comprising mounting the first and second sub-walls substantially perpendicular to the main walls.

7. The method of claim 3, wherein the first cutting line and the second cutting line are substantially parallel to the first end line.

8. A raw panel for a liquid crystal display, comprising:

a first substrate having first electrodes;

a second substrate opposing the first substrate, the second substrate having second electrodes on a surface that opposes the first substrate; and a plurality of main walls having a predetermined height between the first and second substrates to thereby define a plurality of separate channels between the first substrate and the second substrate, wherein the channels include sets of pixels, each set of pixels being formed by at least two neighboring channels;

wherein at least one channel of the sets is divided into two separate spaces along a longitudinal direction of main walls by a sub-wall mounted between main walls; and wherein a first end line is formed along one of two ends of the main walls and a second end line is formed along an end of main walls opposite that along which the first end line is formed, the raw panel being opened between the main walls at the first end line and at the second end line.

9. The raw panel for a liquid crystal display of claim 8, wherein each set of pixels is formed by three neighboring channels.

10. The raw panel for a liquid crystal display of claim 9, wherein each set of pixels includes sub-walls mounted between the main walls defining each different channel, and distances of sub-walls to a first end line, which is formed along one of two ends of main walls, are formed differently.

* * * * *